United States Patent [19]

Martin, Jr.

[11] 4,310,602
[45] Jan. 12, 1982

[54] AIR FIN COOLERS

[75] Inventor: Walter L. Martin, Jr., Lexington, N.C.

[73] Assignee: PPG Industries, Inc., Pittsburgh, Pa.

[21] Appl. No.: 46,533

[22] Filed: Jun. 7, 1979

Related U.S. Application Data

[62] Division of Ser. No. 969,529, Dec. 14, 1978, Pat. No. 4,214,884.

[51] Int. Cl.³ .................... C03B 25/00; B01D 39/10
[52] U.S. Cl. .................................. 428/596; 65/12; 210/498
[58] Field of Search ................. 428/596; 65/12; 210/498

[56] References Cited

U.S. PATENT DOCUMENTS

| | | | |
|---|---|---|---|
| 3,303,254 | 2/1967 | Simons | 210/498 |
| 3,468,025 | 9/1969 | Messinger | 428/596 |
| 3,594,134 | 7/1971 | Russell et al. | 428/596 |
| 3,649,430 | 3/1972 | Lewis et al. | 428/596 |
| 3,730,768 | 5/1973 | Pause | 210/498 |
| 4,141,838 | 2/1979 | Schilling | 210/498 |

*Primary Examiner*—Brooks H. Hunt
*Attorney, Agent, or Firm*—John E. Curley

[57] ABSTRACT

A thin nickel fin cooler is described which has a plurality of precision holes of equal size formed thereon, the fin being tubular in shape so that air can pass from the interior of the fin outwardly to provide uniform gas flow in all directions from the surface of the fin.

4 Claims, 3 Drawing Figures

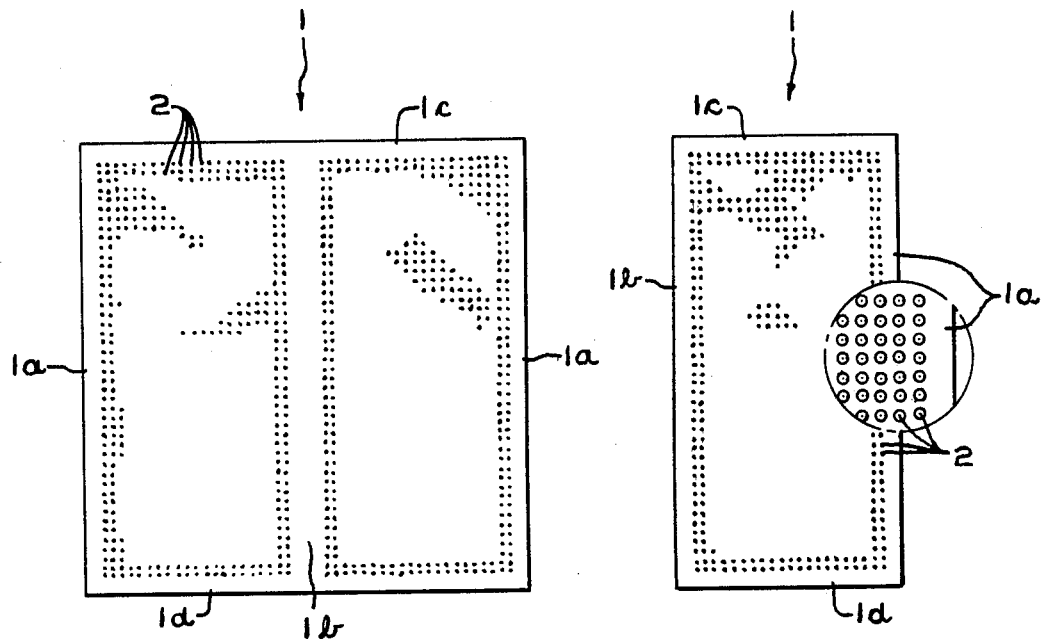
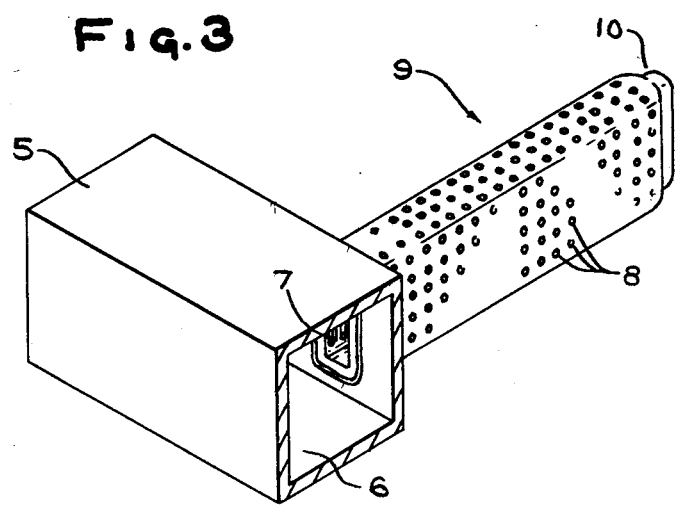

AIR FIN COOLERS

This is a division of application Ser. No. 969,529, filed Dec. 14, 1978 now U.S. Pat. No. 4,214,884.

BACKGROUND OF THE INVENTION

In U.S. Pat. Nos. 3,150,946 and 3,345,147 fin coolers are described for use in cooling fiber glass forming bushings for the manufacture of glass fibers. In both of these patents the patentee discusses the utilization of fin cooler assemblies which are utilized below the orifices through which the glass fibers are attenuated in a glass fiber forming operation. The fin coolers are distinguished by the fact that the fins constructed to be placed between the orifices or rows of orifices of the fiber glass bushing are constructed of a wire mesh material so that air can be blown from a central manifold through each of the fins and exit through the fins to cool the glass cones and thus control the fiber forming operation. Generally speaking, in modern fiber glass manufacturing fin coolers are employed which are made out of solid plates, which are mounted on a manifold similar to that shown in the aforesaid patents and through which a cooling fluid such as water flows thereby removing heat absorbed by the fins by indirect heat exchange. Fin coolers of this type are shown in U.S. Pat. No. 2,908,036. The wire mesh fins mentioned above utilize instead of indirect heat exchange a fluid such as air or other gaseous substance to accomplish cooling. Thus, air is passed through the fins and removes the heat from the surface of the fins and the glass cones and filaments in a downward fashion from the forming area of the bushing to a location below the bushing, thus eliminating the need for the passage of substantial quantities of liquid cooling fluid utilized in those instances where solid fins are employed and indirect heat exchange is utilized to remove heat.

One of the problems associated with the air fins shown in the prior art patents mentioned above is the fact that in the formation of the fin itself, considerable distortion of the apertures provided by the wire mesh from which the fins are constructed occurs when the wire mesh is bent to form the generally flat tubular fin structures shown in the patents. This is caused by the fact that the wire mesh from which the fin is constructed is a woven material. In the bending of the material the wires move causing areas where substantial flexing of the wire mesh screen has occurred, for example, at the top of the fins, to close or to open. This causes the apertures to be small in some areas, large in others and thus prevents a uniform distribution of the gaseous material exiting the fin. Thus, while the concept is viable in providing a cooling gas such as air or other inert gas as a medium to cool the glass fibers as they are attenuated from the orifices which are adjacent to the fin, nonuniformity of air flow and in some instances lack of air flow in a given area results in uneven cooling and nonuniformity of the operation.

THE PRESENT INVENTION

In accordance with the instant invention, a fin cooler is provided which enables the utilization of a gaseous cooling medium such as air or other inert gases in a fin cooler assembly similar to those as shown in the U.S. Pat. Nos. 3,150,946 and 3,345,147, both of which are incorporated by reference while providing for uniform distribution of that gas as it exits the fins. This is accomplished because all of the apertures contained in the fins of the present invention are exactly the same in size so that air can be distributed uniformly to the cones adjacent to the fins and uniformly distributed in an upward direction toward the bushing to cool the faceplate of the bushing during operation. Thus, the present invention involves a fin assembly which is constructed of a solid, thin, nickel, tubular blade which is provided with a plurality of precisely sized apertures. Each of the apertures provided in the blade is the same size as every other aperture in the blade and the fin is provided with a solid nickel closure on one end of the blade to effectively seal the end and render it impervious to the flow of fluid through it. The other end of the blade is open and is provided with means on it to mount the blade to a fluid supply source. In a further embodiment of the invention a blank is provided which is suitable for use in producing the apparatus of the fin assembly described in the instant specification which involves the utilization of a sheet of nickel provided with a plurality of apertures. The apertures are all sized the same as each other and are sufficient in number to cover the major portion of the blank utilized to form the fin cooler. A border is provided on the sheet made out of solid nickel to enclose the area on the sheet in which the apertures are located and the border is precisely sized to be of a width of between about 0.062 to 0.093 inch (0.159 to 0.236 centimeters) in width. Provision is also made in the instant invention to provide a blank for fabricating several fins from a single blank of sheet metal.

DETAILED DESCRIPTION OF THE INVENTION

The invention will be described now with reference to the accompanying drawing in which:

FIG. 1 is a diagrammatic illustration of a blank suitable for use in preparing two fins for utilization in a fin cooler in accordance with the instant invention;

FIG. 2 is a diagrammatic illustration of a single blank to prepare a single fin for a fin cooler assembly in accordance with the instant invention; and FIG. 3 is a diagrammatic illustration of a manifold with a fin fabricated from a sheet such as FIG. 2, the fin being mounted on the manifold for distribution of gas therethrough.

Turning to FIG. 2 there is shown a generally rectangular sheet indicated generally by the numeral 1 which is provided with a plurality of apertures 2 thereon which define a generally rectangular area on the sheet 1. Sheet 1 is constructed of solid nickel and the apertures are provided on the sheet to supply approximately 1200 to 1600 holes per square inch, preferably 1400 holes per square inch. The hole diameter of the apertures is in the range of 0.015 to 0.017 inch (0.0381 to 0.0432 centimeter) and preferably 0.0165 inch (0.042 centimeter). Borders 1a, 1b, 1c and 1d are provided around the area of the apertures 2 and these borders are solid nickel. In the fabrication of a fin utilizing a blank such as shown in FIG. 2, the blank is formed into the tubular shape of a fin such as fin 9 of FIG. 3 with borders 1a and 1b being overlapped on the bottom of the fin 9 and welded along the solid portion of the border 1a and 1b. It is an important consideration in preparing fins utilizing the instant invention that the borders 1a and 1b be provided in a specific width. Preparation of fin assemblies in accordance with the instant invention with borders below the lower limit are to be avoided since welding close to the apertures causes hole closure and inadequate air distribution to the bottom of the fin. Thus, borders 1a and 1b are sized to provide a width from the aperture area of the blank 1 to the edge of the blank of between 0.062 and 0.093 inch (0.159 and 0.236 centimeter). Utilization of borders outside of these ranges results in either inadequate space for welding seams 1a and 1b together if the borders are smaller or if they are larger, a substantial overlapping of the borders which results in a substantial reduction in the distribution of air through the bottom of the fins.

In FIG. 1 a blank is shown which may be utilized to provide two fins from a single blank. This is for illustrative purposes only. It will be readily understood by the skilled artisan that any number of fins can be provided using blanks of similar shape. In the construction of a blank of this character the essential difference between utilizing this and the blank of FIG. 2 is the provision between the rectangular areas of the apertures 2 shown in the drawing of a double width border which generally is of a width between 0.125 and 0.187 inch (0.137 and 0.472 centimeter). This border provides, when the two rectangular areas of the apertures 2 are separated by cutting the blank in two along this border, a sufficient border on the resulting blanks for fabrication of the tubular fins with an adequate border on each side of each of the fins constructed from the single blank. Similar wider borders are provided if the blank of FIG. 1 is utilized to construct three, four or more fins from a single sheet between each apertured section of such a blank.

The essential difference in providing an apertured fin utilizing the instant invention over that described in the prior art is the fact that the sheet metal utilized to provide the fin is solid nickel and it is not a wire mesh or a woven material. Thus, when the blanks are bent and formed into the shape of the final fin, each aperture has the same size as every other aperture and thus uniform air can be distributed to the cones of glass emanating from the bushing tips located adjacent the fins when they are placed in service and uniform air is distributed in an upward fashion to the faceplate of the bushing during the forming operation so that uniform cooling of the faceplate of the bushing can also take place. The apertures on the blanks of the instant invention are provided by the utilization of photochemical machining methods. These methods are well known to the art and form no part of the instant invention. In general the process involves cleaning the metal, coating it to apply a photopolymer resist coating, printing the aperture size on the coating utilizing photographic equipment, removing the unexposed resist coating leaving the image on the bare metal and then utilizing chemicals as the cutting tools for the apertures. By control of temperature and concentration of the etching solutions, a uniform etch rate can be obtained for most metals including nickel. Common etching chemicals utilized in this industry are ferric chloride and strong mineral acids such as nitric, sulfuric, hydrochloric and hydrofluoric. In etching nickel, electrolytic etching techniques are used in which an electric current is induced into the part to be etched while it is immersed in an acid medium, preferably a strong mineral acid. This process is described in more detail in AUTOMATION, Vol. 7, No. 8, August 1970, pages 22 to 26.

It is an important consideration that the blanks be fabricated of solid nickel. Nickel is a particularly useful metal since it requires little or no cleaning in a fiber glass forming environment. Fins made of other metals require frequent cleaning. This problem is discussed in detail in U.S. Pat. No. 3,468,644 in which a nickel coated fin is employed in a fin cooler assembly to provide ease in cleaning solid plate fins. Solid plate nickel fins could also be used, but the cost over a nickel plated copper fin would be considerable.

In the instant invention thin metal sheets of nickel are employed, thus providing a useful surface in a glass fiber forming area, i.e., little or no cleaning required, while avoiding the necessary coating or plating of substrates required by the above patent. Further, using metal thicknesses of between 0.0052 to 0.01 inch (0.005 to 0.025 centimeter), an acceptable nickel blank can be made from which fins can be constructed and at a reasonable cost. Preferably, the nickel metal blanks are between 0.005 to 0.007 inch (0.012 to 0.019 centimeter) in thickness.

Thus, the instant invention provides fins which are capable of distributing gaseous medium to a glass fiber forming area in a uniform manner, at low cost and with advantageous environmental benefits in requiring little or no cleaning. While the invention has been described with reference to certain specific embodiments, it is not intended to be limited thereby except insofar as appears in the accompanying claims.

I claim:

1. A blank suitable for forming a hollow tubular blade adapted to be placed between cones of glass issuing from a fiber glass bushing and capable of being supplied internally with cooling fluid comprising a sheet of nickel provided with a plurality of apertures, said apertures being on said sheet in a concentration of between 1200 to 1600 apertures per square inch, each of said apertures being the same size as all others, the apertures being sufficient in number to cover the major portion of said sheet, a border on said sheet of solid nickel enclosing the area of said apertures, said border being between 0.062 to 0.093 inch (0.159 to 0.236 centimeter) in width said border providing a welding seam when the blank is bent to form a tubular shape.

2. The blank of claim 1 wherein said nickel sheet has a thickness of 0.002 to 0.007 inch (0.005 to 0.025 centimeter).

3. A blank suitable for forming a hollow tubular blade adapted to be placed between cones of glass issuing from a fiber glass bushing and capable of being supplied internally with cooling fluid comprising a sheet of solid nickel, providing on said sheet at least two rectangular areas having a length and width sized to produce a fin of given length and width when bent into a generally flat tubular shape, each of said rectangular areas being provided with a plurality of apertures of idential size said apertures being on said sheet in a concentration between 1200 to 1600 apertures per square inch, a solid nickel border around the entire sheet having a width of between 0.062 to 0.093 inch (0.159 to 0.236 centimeter), and a solid nickel strip being located between each of said rectangular areas, said strip having a width of between 0.125 to 0.187 inch (0.317 to 0.472 centimeter), said border and one half of said strip forming a welding seam when said blank is cut in half along said strip and the resulting halves are formed into tubular shape.

4. The blank of claim 3 wherein said nickel sheet has a thickness of 0.002 to 0.007 inch (0.005 to 0.017 centimeter).

* * * * *